Oct. 8, 1946.                C. D. PETERSON ET AL                 2,409,148
                       SYNCHRONIZING CLUTCH CONSTRUCTION
                      Filed Jan. 20, 1945          2 Sheets-Sheet 1
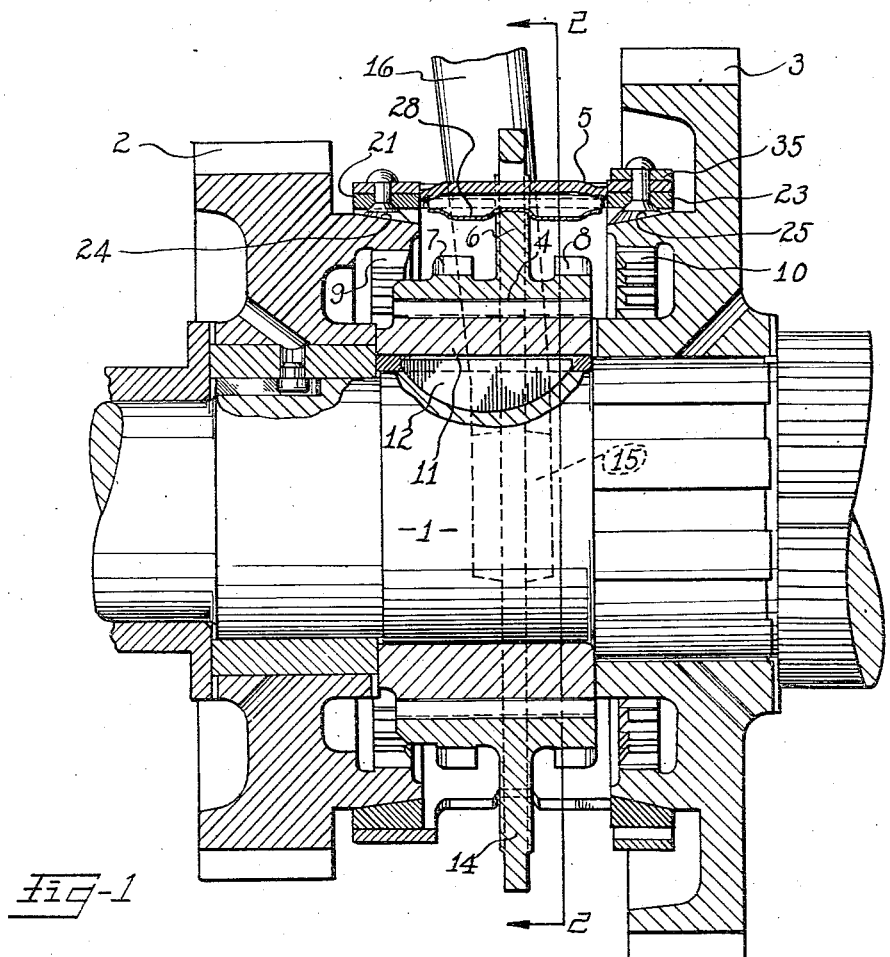
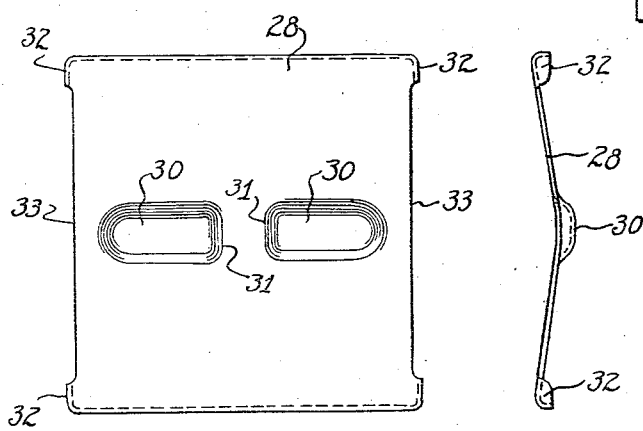
INVENTORS
CARL D. PETERSON
ROBERT R. BURKHALTER
BY
ATTORNEYS

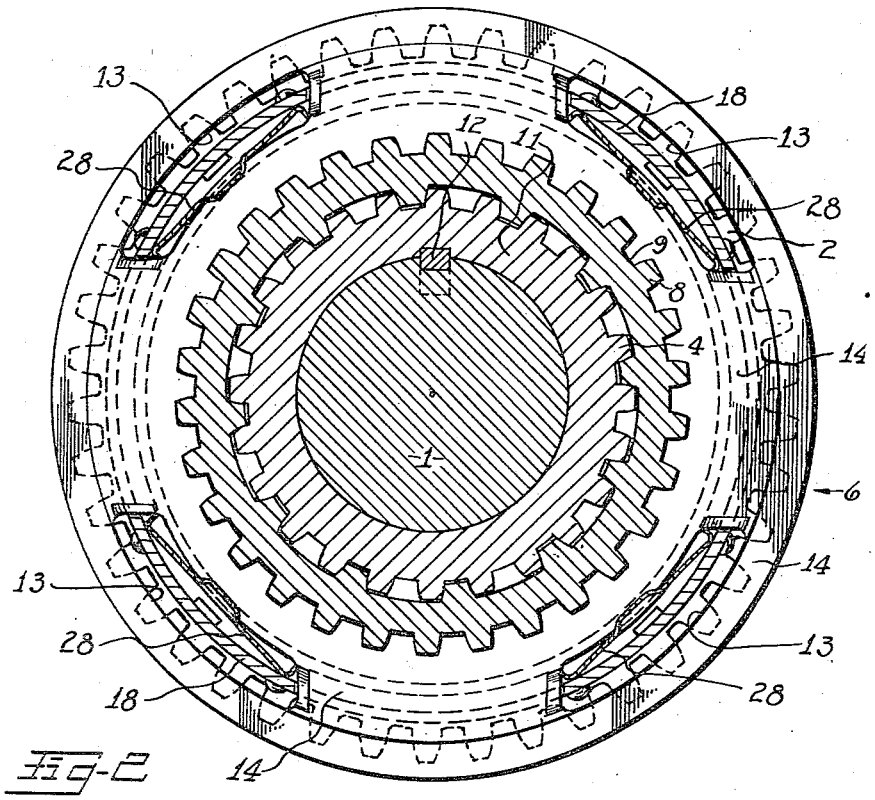
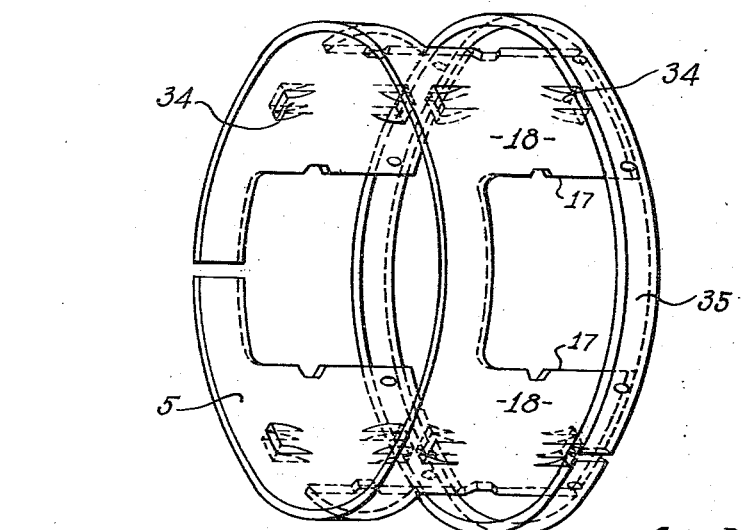

Patented Oct. 8, 1946

2,409,148

UNITED STATES PATENT OFFICE 2,409,148

SYNCHRONIZING CLUTCH CONSTRUCTION

Carl D. Peterson and Robert R. Burkhalter, Toledo, Ohio

Application January 20, 1945, Serial No. 573,731

6 Claims. (Cl. 192—53)

This invention relates to synchronizing clutches of the type including a jaw member and a friction sleeve member around the jaw member, and has for its object a simple and readily assembled spring structure for normaly yieldingly coupling the friction sleeve member to the jaw member, so that the two members shift axially as a unit until the sleeve member is stopped by engagement with a complemental friction surface, and then yields to permit the jaw member to shift relative to the friction sleeve to engage a circumferential jaw clutch surface, or has for its object a modified form of the spring construction shown in our pending application, Serial Number 556,963, filed October 3, 1944.

The invention consists in the novel features and in the combinations and constructions hereinafter set forth and claimed.

In describing this invention, reference is had to the accompanying drawings, in which like characters designate corresponding parts in all the views.

Figure 1 is a longitudinal sectional view of a synchronizing clutch embodying this invention, the adjacent portion of the coacting elements of a transmission gearing being also shown.

Figure 2 is a sectional view on line 2—2, Figure 1.

Figure 3 is a detail isometric view of the body of the friction sleeve member.

Figures 4 and 5 are respectively plan and edge views of the spring forming the subject matter of this invention.

With the exception of the spring shown in Figures 4 and 5, this clutch is of the same construction as that shown in the pending application, Serial Number 556,963.

In the drawings, the numeral 1 designates a driving element or shaft, and 2 and 3 driven elements selectively clutchable to the driving element 1 through the clutch construction. The driving element, as here shown, is a shaft, and the driven elements, gears clutchable to the shaft, these being gears in a train through final drive or tail shaft of a transmission gearing, although the reverse may be the fact, that the shaft 1 is a driven shaft and the gears 2, 3, final drive gears in trains actuated by a prime moving shaft. The gears 2, 3 are here shown as rotatably mounted on or concentric with the shaft 1.

4 and 5 designate respectively the toothed or jaw member and the friction or sleeve member of this clutch, the jaw member 4 being mounted on the shaft 1 to rotate therewith and shift axially thereof, and the friction sleeve member being a cylindrical band having internal friction rings at its opposite ends. The member 4 is here shown as an integral or one-piece structure having a hub and a peripheral annular flange 6 and sets of clutch teeth 7 and 8 on the hub on opposite sides of the flange 6 for coacting with complemental sets of internal teeth 9 and 10 on cylindrical flanges of the gears 2, 3, respectively. The hub is here shown as slidably splined on a collar 11 keyed at 12 to the shaft 1. The annular flange 6 is formed with transverse arcuate slots extending in a circumferential direction providing webs 14 between the ends of the slots. The outer rim of the flange coacts with shifting means and extends into grooves in shoes or blocks 15 on a shifting fork 16.

The sleeve 5 is preferably formed up of sheet metal and provided with lengthwise slots 17 at intervals, which open through one end only of the band, thus providing land portions or prongs 18. Said portions or prongs extend through the arcuate slots 13. The prongs are provided with means for blocking engagement until the speeds of the parts to be clutched together synchronize, but this means forms no part of the invention. The side edges of the prongs, which are the side walls of the slots 17, are provided with notches for coacting with the end walls of the webs 14 between the ends of the arcuate slots 13 to block shifting-in of the toothed clutch member until the speeds are synchronized.

The sleeve or friction member 5 is provided with internal friction rings 21, 23 at its opposite ends for coacting with complemental friction rings or faces 24, 25 on the gears 2 and 3, respectively.

In operation, the members 4, 5 first shift as a unit and bring the friction ring 21 or 23 into frictional engagement with the complemental friction face 24 or 25 in accordance with the direction in which the shift is made from neutral. Continued shifting-in causes the member 4 to shift relatively to the sleeve or friction member 5 and bring the jaw 7 into engagement with the jaw 9, or the jaw 8 into engagement with the jaw 10. The shifting of the jaw section 4 axially relatively to the friction sleeve 5 is normally yieldingly resisted so that the two members shift as a unit until the friction members are engaged, by means comprising bow springs 28 extending through the arcuate slots 13 and lengthwise of the band or friction member 5 radially inward from the land portions or prongs 18, the bow springs having spaced apart bosses 30 struck therefrom at their apex portions, the bosses being spaced apart in a direction axially of the clutch and forming a depression or seat 31 centrally of the spring for the inner walls in a radial direction of the arcuate slots 13. Each of the springs 28 is rectangular in general form in plan and is provided with feet 32 at its corners, which abut against the inner edges of the internal bands 21, 23, the end edges 33 between the feet being spaced from the bands 21, 23. The bosses 30 resist relative axial shifting of the members 4, 5 until the shifting of the friction member 5 is stopped and then continued shifting-in force applied causing the inner walls of the arcuate slots to cam up the inclined sides of the bosses, while the member 4 is shifting axially relatively to the member 5. The feet 32 or the insetting of the end edges 33 of the spring causes the spring 28 to contact the friction rings 21, 23 at spaced apart points only of small area. This construction frees the spring 28 of the friction rings, and hence enhances the flexibility of the spring. As the sleeve 5 is rolled up into a band, as seen in Figure 3, and hence is a split band, the split opening into the end of one of the lengthwise slots between the prongs of the band, a reinforcing band 35 is provided around the split end of the sleeve 5, this band being preferably a split ring or band rolled up from the flat strip into circular form. It is located with its ends at the split out of line or diametrically opposite to the split in the sleeve or band 5. The reinforcing band 35 is secured in position by the same rivets or fastening members which secure the friction ring 23 to the band 5. This reinforcing band or ring 35 prevents any outward distortion due to the centrifugal force, or reinforces the margin of the split band 5 and the friction ring 25 at that margin.

For the purpose of locating the friction rings 21, 23, the band is provided with lugs 34 struck therefrom. These lugs, however, form no part of this invention.

What we claim is:

1. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, and a friction member including a sleeve having lengthwise slots extending through the arcuate slots of the flange, the portions between the lengthwise slots being formed to coact at their side edges with the end walls of the arcuate slots to block relative shifting movement except when the speeds of the driving and driven elements approach synchronization, internal bands at opposite ends of the sleeve, and a bow spring extending lengthwise of each of said portions and having its apex portion provided with spaced apart bosses providing a depression arranged astride the inner wall of the arcuate slot, with the bosses on opposite sides of the flange in an axial direction, the spring thrusting at its ends against the bands.

2. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, the other being a friction member including a sleeve having lengthwise slots, the portions between the lengthwise slots extending through the arcuate slots of the flange, said portions being formed to coact at their side edges with the end walls of the arcuate slots to block relative shifting movement except when the speeds of the driving and driven elements approach synchronization, internal bands at opposite ends of the sleeve, and a bow spring rectangular in general form extending through each of the arcuate slots lengthwise of the sleeve and coacting at its apex with the inner wall of the arcuate slot and having feet at its corners abutting against the bands.

3. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, the other being a friction member including a sleeve having lengthwise slots, the portions between the lengthwise slots extending through the arcuate slots of the flange, said portions being formed to coact at their side edges with the end walls of the arcuate slots to block relative shifting movement except when the speeds of the driving and driven elements approach synchronization, internal bands at opposite ends of the sleeve, and a bow spring rectangular in general form extending through each of the arcuate slots lengthwise of the sleeve and coacting at its apex with the inner wall of the arcuate slot and having feet at its corners abutting against the bands, the spring being provided with bosses at the apex portion thereof spaced apart in a direction lengthwise of the sleeve forming a depression at the apex portion for receiving the wall of the arcuate slot, said bosses coacting with the walls of the arcuate slot with a cam action.

4. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, the other being a friction member including a sleeve having lengthwise slots, the portions between the lengthwise slots extending through the arcuate slots of the flange, said portions being formed to coact at their side edges with the end walls of the arcuate slots to block relative shifting movement except when the speeds of the driving and driven elements approach synchronization, internal friction bands at opposite ends of the sleeve, and a bow spring rectangular in general form extending through each of the arcuate slots lengthwise of the sleeve and coacting at its apex with the inner wall of the arcuate slot, the spring having spaced apart bearing points at its end edges contacting the edges of the friction bands, the end edges of the spring between the contact points being spaced from the edges of the bands to maintain the flexibility of the spring.

5. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, the other being a friction member including a sleeve having lengthwise slots, the portions between the lengthwise slots extending through the arcuate slots of the flange, said portions being formed to coact at their side edges with the end walls of the arcuate slots to block relative shifting movement except when the speeds of the driving and driven elements approach synchronization, internal friction bands at opposite ends of the sleeve, and a bow spring rectangular in general form extending through each of the arcuate slots lengthwise of the sleeve and coacting at its apex with the inner wall of the arcuate slot, the spring having spaced apart bearing points at its end edges contacting the edges of the friction bands, the end edges of the spring between the contact points being spaced from the edges of the bands to maintain the flexibility of the spring, and the spring being provided with bosses at the apex portion thereof spaced apart in an axial direction lengthwise of the spring providing a depression for receiving the wall of the arcuate slot.

6. In a synchronizing clutch of the type shiftable in opposite directions from neutral to connect together driving and driven elements through different speed ratios, including two members, one being a toothed member rotatable with and shiftable axially of one of said elements into and out of clutching engagement and having an annular peripheral flange, the flange being formed with arcuate slots extending through the opposite faces thereof, the other being a friction member including a sleeve having lengthwise slots, the portions between the lengthwise slots extending through the arcuate slots of the flange, said portions being formed to coact at their side edges with the end walls of the arcuate slots to block relative shifting movement except when the speeds of the driving and driven elements approach synchronization, internal bands at opposite ends of the sleeve, the sleeve being a split band, the slots extending through one end only of the sleeve of the split extending through the closed end of one only of the slots, friction bands secured to the ends of the sleeve within the same, one of the bands extending across the open ends of said slots, a reinforcing split band encircling the margin of the sleeve at the open ends of the slots, the split of the last band being out of line with that of the sleeve, and a bow spring extending through each of the arcuate slots lengthwise of the sleeve and coacting at its apex with the inner wall of the arcuate slot and thrusting at its ends against the inner edges of the friction bands.

CARL D. PETERSON.
ROBERT R. BURKHALTER.